Feb. 27, 1940.　　J. S. FISHER　　2,191,460
ARTICLE OF MANUFACTURE
Filed March 28, 1936　　2 Sheets-Sheet 1

Inventor
JOHN S. FISHER
Ridley & Watts
Attorney

Feb. 27, 1940.    J. S. FISHER    2,191,460
ARTICLE OF MANUFACTURE
Filed March 28, 1936    2 Sheets-Sheet 2

Inventor
JOHN S. FISHER
By Richey & Watts
Attorneys

Patented Feb. 27, 1940

2,191,460

UNITED STATES PATENT OFFICE 2,191,460

ARTICLE OF MANUFACTURE

John S. Fisher, Akron, Ohio, assignor to The General Metals Powder Company, Akron, Ohio, a corporation of Ohio Application March 28, 1936, Serial No. 71,529

6 Claims. (Cl. 192—107)

This invention relates to improved clutch plates, brake shoes, bearings and the like and particularly to an improved metallic body, formed from powdered metal, bonded to a steel or other suitable backing member.

Materials, referred to hereinafter as "networks" composed of mixtures of powdered materials such as copper, tin, lead, zinc, etc., together with certain other ingredients, formed under high pressure, have been found to be particularly adapted for clutch plate facings, brake linings, bearings and other uses. In order to use such materials most advantageously it has been found desirable to have the body which is formed from powdered metal secured to a backing plate of steel or other suitable metal, of homogeneous nature as compared with the powdered metal material, having the required form and strength.

It is an object of my invention therefore to produce improved articles such as bearings, clutch facings, brake linings and the like by firmly attaching material of the type referred to to metal backing plates either with or without the use of flux and either with or without simultaneous heat treatment of the powdered metal material.

A further object of my invention is the provision of improved clutch plates, bearings, brake linings and the like composed of a metal backing plate having the requisite strength to which is bonded a facing of pressed powdered metal network material in which the step of heat treating the network material to obtain the desired characteristics thereof and the steps of bonding the facing to the backing are combined and carried out simultaneously.

The above and other objects of my invention will appear from the following description of certain forms of my improved articles and certain preferred procedures for carrying out my method, reference being had to the accompanying drawings, in which—

Figure 1 is a microphotograph showing the bond I obtain between a steel backing plate and a friction metal formed from compressed and heat treated powdered materials. In the example illustrated in the drawings the friction material, which is indicated at A, had the following composition:

Figure 1:
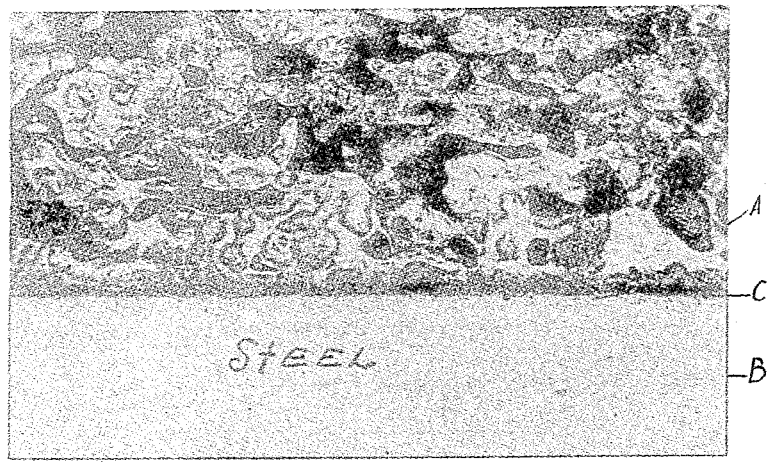
Figure 1 is a microphotograph illustrating a typical bond formed between a steel backing plate and a friction material made from powdered ingredients.

| | Per cent |
|---|---|
| Copper | 82 |
| Tin | 10 |
| Lead | 3 |
| Zinc | 5 |

In this mixture the copper, tin, lead and zinc were all mixed in powdered form. This mix represented one hundred parts to which were added five parts of graphite and three parts of silica. This was formed in the desired shape under a pressure of approximately 15 tons per square inch. The resulting material was then placed on the steel base B and weights or clamps used to insure a firm and even contact between the friction material and the base. However, such weights or clamps are not absolutely necessary as satisfactory bonding has been done without such loading.

The assembly was then placed in a non-oxidizing atmosphere, such as hydrogen or other suitable gas, and heated to a temperature of approximately 1300° F. In bonding relatively small parts to a steel backing I have found that excellent results are obtained, with the particular mixture specified above, if the parts are maintained at 1300° F. for twenty minutes and then allowed to cool to room temperature in a non-oxidizing atmosphere. In some instances it is found desirable to quench the heat treated parts in water or other suitable medium.

The type of bond illustrated in the drawings will be formed and the powdered metal material will be firmly and permanently secured to the backing. As is seen in the drawing the material A is alloyed with the steel B at the point of contact C and a very effective brazed type of joint is obtained. I have found that successful results may be obtained without the use of any flux whatsoever. I have also found that successful results may be obtained when a flux consisting of one-third powdered copper, one-third powdered zinc and one-third powdered borax is dusted on the steel backing before the friction material is positioned thereon.

The above described procedure relates to a particular material but my bonding process is adapted to be employed with powdered metal materials having different compositions from that specified above and particularly with all of the types of materials described and claimed in my U. S. Patent No. 2,072,070, issued February 23, 1937. This application relates to articles made up of finely divided ingredients formed into a strong, malleable, metallic network substantially continuous and free from interruptions and including between 65% and 95% of copper, between about 35% and about 5% of other materials, such as tin, lead and zinc, and between about 3% and 20% of inorganic, non-metallic material, such as graphite and/or silica. By varying the amount of graphite used the properties of the resulting self-lubricating material may be controlled. By adding silica or other suitable abrasive materials to the mixture very effective friction materials for brake linings and the like can be produced. It will be understood that where the term network is used in this specification and the appended claims it includes within its scope all of the above types of materials.

My said co-pending U. S. application also discloses and claims a method of making articles from powdered material in which the powdered ingredients are subjected to high pressure to compress the article to the desired thickness. Then it is subjected to heat treatment, preferably between 1100° F. and the melting point of copper for between about 3 minutes and 20 minutes in a protective atmosphere.

I have found that the heat treating step of the process disclosed and claimed in said co-pending application can be effectively combined with the bonding step of my present invention and that in a number of instances it is possible to heat treat friction facings and bond them to a suitable backing member in a single heating operation. For example, in the specific illustration given above, the friction material and the backing member were subjected to a temperature approximately 1300° F. for 20 minutes. This procedure comes well within the range of heat treatment defined in my said co-pending application, Serial No. 681,861 and thus friction articles of this class may be heat treated and bonded to backing plates in a single operation.

Figure 2:
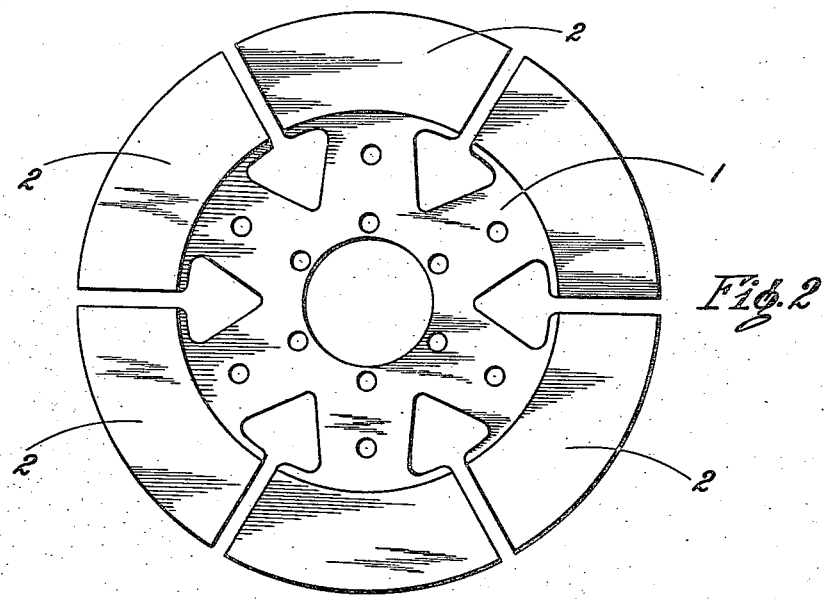
Figure 2 illustrates one of my improved clutch plates.
Figure 3:
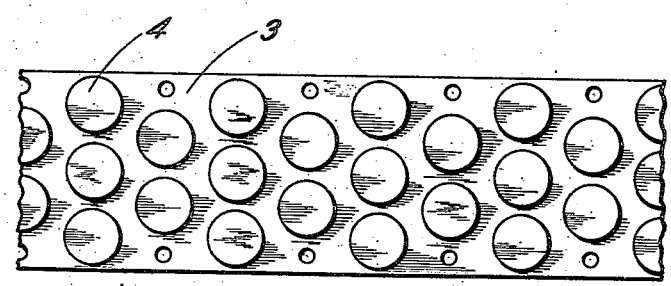
Figure 3 illustrates an improved brake lining member.
Figure 4:
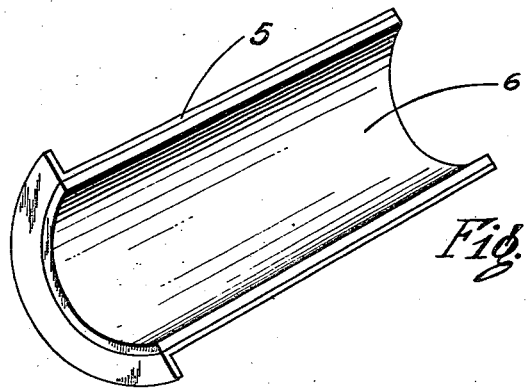
Figure 4 illustrates one of my bearings of the type commonly used in internal combustion engines.

Figures 2, 3 and 4 of the drawings are intended to be merely illustrative of the general form of my improved clutch plates, bearings and brake linings. The clutch plate illustrated in Figure 2 comprises a steel web or spider 1 which is divided into a plurality of segmental portions to both sides of which are bonded the powdered metal material facing plates 2.

In Figure 3 the brake lining includes a steel backing member 3 to which is bonded a plurality of friction material buttons 4. I have also successfully produced, by my improved method, brake lining elements comprising a brass or other non-ferrous metal backing plate and a facing of powdered metal material, preferably containing a major percentage of copper, integrally bonded thereto. The bearing of Figure 4 includes the semi-cylindrical steel backing member 5 and a correspondingly shaped anti-friction material bushing 6 which is bonded thereto by the process described herein. In all of these articles it is extremely important that an absolutely integral structure be formed and that all possibility of separation be eliminated. My improved articles in which the steel backing member gives the requisite strength and the powdered metal facing provides the desired surface material have proved to be very successful in actual use.

The above described procedure for bonding the powdered metal material to the backing may be followed in making these articles. In some cases it may be found, however, that the heat necessary to effect the bonding can advantageously be supplied by electrical resistance. When an electrical current is passed through the powdered metal material and the backing, the increased resistance at the point of contact therebetween causes sufficient heating to effect the fusion of two materials and bonding thereof. Also, the articles may be placed in a high frequency electrical field so that electric currents are induced in the articles themselves and the heat caused by the resistance to flow of such induced currents at the joint between the materials effects the bonding.

In addition to the procedure described above it has also been found possible to electrically deposit mixtures of copper and graphite on a solid metal member, such as a steel backing plate, and such deposition results in a strong and permanent integral connection of the bonded material with the backing plate.

Although I have described my invention in connection with certain types of powdered metal materials, certain forms of articles and several particular procedures for obtaining the desired bond, it will be understood by those skilled in the art that my improved articles and my method of brazing or bonding powdered metal materials to metal backing plates or supports may be modified as required to take care of the conditions encountered. Also different fluxes and mixtures of powdered materials may be used and the heat treatment may be modified within reasonable limits without departing from the spirit of my invention. I do not, therefore, wish to be limited to the specific method and materials herein described and claimed, but claim as my invention all embodiments thereof coming within the scope of the appended claims.

I claim:

1. As an article of manufacture, a clutch plate consisting of a generally disk shaped steel supporting spider and a metallic network friction member attached integrally thereto at all points of engagement therebetween.

2. As an article of manufacture, a clutch plate consisting of a generally disk shaped steel supporting spider and network material friction members attached integrally thereto on opposite sides thereof at all points of engagement therebetween.

3. As an article of manufacture, a brake element consisting of a metallic backing member and a network friction member integrally attached to one side thereof at all points of engagement therebetween.

4. As an article of manufacture, a brake element consisting of a brass backing member and a network friction member containing a major proportion of copper integrally attached to said brass backing member at all points of engagement therebetween.

5. An article of manufacture of the type described consisting of a metal backing member, a non-ferrous lining member attached integrally thereto, said non-ferrous lining being composed of a strong, malleable, metallic network substantially continuous and free from interruptions and containing between about 65% and 95% copper, between about 3% and about 15% tin, and between about 5% and about 15% lead, together with from about three parts to about twenty parts by weight of inorganic non-metallic lubricant material and between about one-half part and about ten parts by weight of inorganic non-metallic friction producing material, said non-ferrous lining member being bonded to said backing member at all points of engagement therewith.

6. An article of manufacture of the type described consisting of a metal backing member and a non-ferrous lining member composed of powdered metals and friction and/or anti-friction materials formed into shape under pressure and heat treated to form a strong, malleable, metallic network substantially continuous and free from interruptions, said non-ferrous lining member being integrally attached to said backing member.

JOHN S. FISHER.